United States Patent [19]

Bharathan

[11] Patent Number: 4,474,142
[45] Date of Patent: Oct. 2, 1984

[54] METHOD AND APPARATUS FOR FLASH EVAPORATION OF LIQUIDS

[75] Inventor: Desikan Bharathan, Lakewood, Colo.

[73] Assignee: The United States of America as represented by the United States Department of Energy, Washington, D.C.

[21] Appl. No.: 471,392

[22] Filed: Mar. 2, 1983

[51] Int. Cl.$^3$ .............................................. F22B 27/00
[52] U.S. Cl. ........................................ 122/40; 60/642
[58] Field of Search ................ 122/40; 60/39.05, 39.3, 60/642

[56] References Cited

U.S. PATENT DOCUMENTS

| | | |
|---|---|---|
| 2,006,985 | 7/1935 | Claude et al. |
| 3,076,096 | 1/1963 | Bachmann . |
| 3,299,937 | 1/1967 | Cook .................................. 122/40 X |
| 3,337,419 | 8/1967 | Kogan . |
| 3,395,085 | 7/1968 | Kogan . |
| 3,457,248 | 7/1969 | Cunningham et al. |
| 3,507,319 | 4/1970 | Kogan . |
| 3,566,673 | 3/1971 | Kogan . |
| 4,105,505 | 8/1978 | Saari . |
| 4,172,766 | 10/1979 | Laing et al. |
| 4,256,536 | 3/1981 | Tyrtyshny et al. |
| 4,282,070 | 8/1981 | Egosi . |
| 4,292,135 | 9/1981 | Klaren . |
| 4,302,682 | 11/1981 | La Coste . |

OTHER PUBLICATIONS

Nisolle, *Rapport Sub Les Essais d'Autoevaporation*, Commission Techique De L'Energies Thermique des Mers, (date unknown), pp. 1-18.
Nisolle, *Utilization De L'Energie Thermique des Mers Les Problemes de Fonctionnement*, Societe des Ingeniors, 1947, pp. 776-826.
ORO-1473-TI, (vol. 1 & 2), 100 MWE OTEC Alternate Power Systems, Contract EG-77-C-05-1473, U.S. Dept. of Energy, Mar. 1979.
Othmer, *Power Fresh Water, and Food From Cold, Deep Sea Water*, Science, vol. 182—No. 4108, Oct. 1973, pp. 121-125.
Othmer, *Power, Fresh Water, and Food From the Sea*, Mechanical Engineering, vol. 98—No. 9, Sep. 1976, pp. 27-34.
Roe et al., *Controlled Flash Evaporation*, Mechanical Engineering, vol. 93—No. 5, May 1971, pp. 27-32.
Walters, *Power in the Year 2001, Part 2—Thermal Sea Power*, Mechanical Engineering, vol. 93—No. 10, Oct. 1971, pp. 21-25.
Anderson et al., *Thermal Power From Seawater, 100,000 KW at 3 Mils Per KWH*, Mechanical Engineering, vol. 88—No. 4, Apr. 1966, pp. 42-46.
Griffin, *Power From the Oceans Thermal Gradients*, Ocean Energy Resources, OED—vol. 4, 1977, pp. 1-21.
Massart, *The Tribulations of Trying to Harness Thermal Power*, Marine Technology Society Journal, vol. 8—No. 9, Oct.-Nov. 1974, pp. 18-21.
Nizery, *Etude Sur les Possibilites d'Utilisation de l'Energie Thermique*, Bulletin del'Institut Oceanographique, No. 006-30, Dec. 1946, pp. 1-47.

*Primary Examiner*—Edward G. Favors
*Attorney, Agent, or Firm*—Kenneth L. Richardson; Jeannette M. Walder; Michael F. Esposito

[57] ABSTRACT

A vertical tube flash evaporator for introducing a superheated liquid into a flash evaporation chamber includes a vertical inlet tube with a flared diffuser portion at its upper outlet end. A plurality of annular screens are positioned in axially spaced-apart relation to each other around the periphery of the vertical tube and below the diffuser portion thereof. The screens are preferably curved upward in a cup-shaped configuration. These flash evaporators are shown in an ocean thermal energy conversion unit designed for generating electric power from differential temperature gradients in ocean water. The method of use of the flash evaporators of this invention includes flowing liquid upwardly through the vertical tube into the diffuser where initial expansion and boiling occurs quite violently and explosively. Unvaporized liquid sheets and drops collide with each other to enhance surface renewal and evaporation properties, and liquid flowing over the outlet end of the diffuser falls onto the curved screens for further surface renewal and evaporation.

11 Claims, 3 Drawing Figures

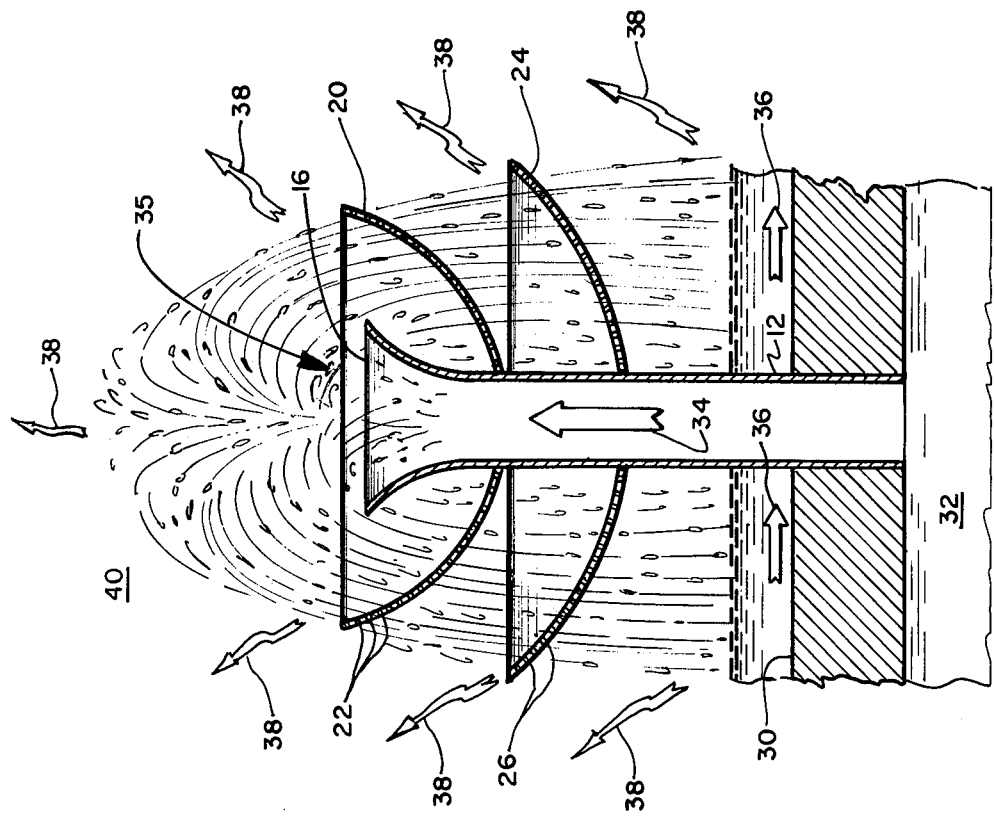
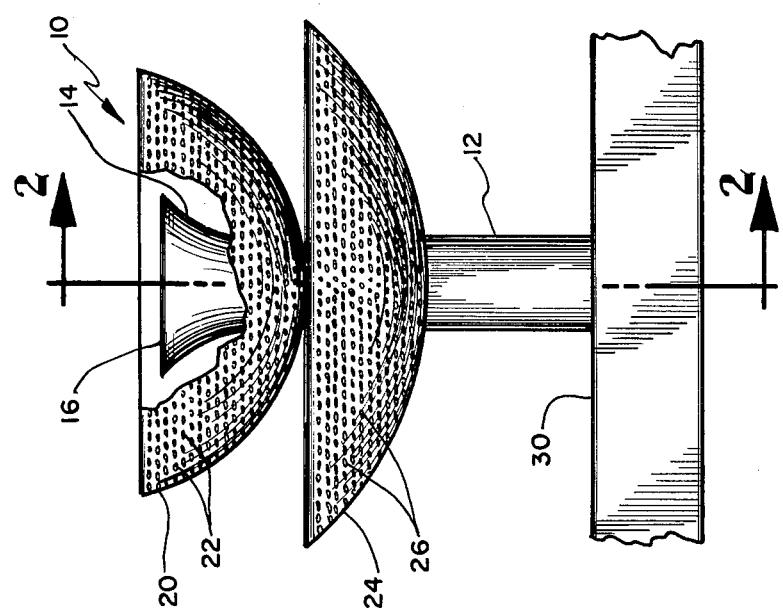

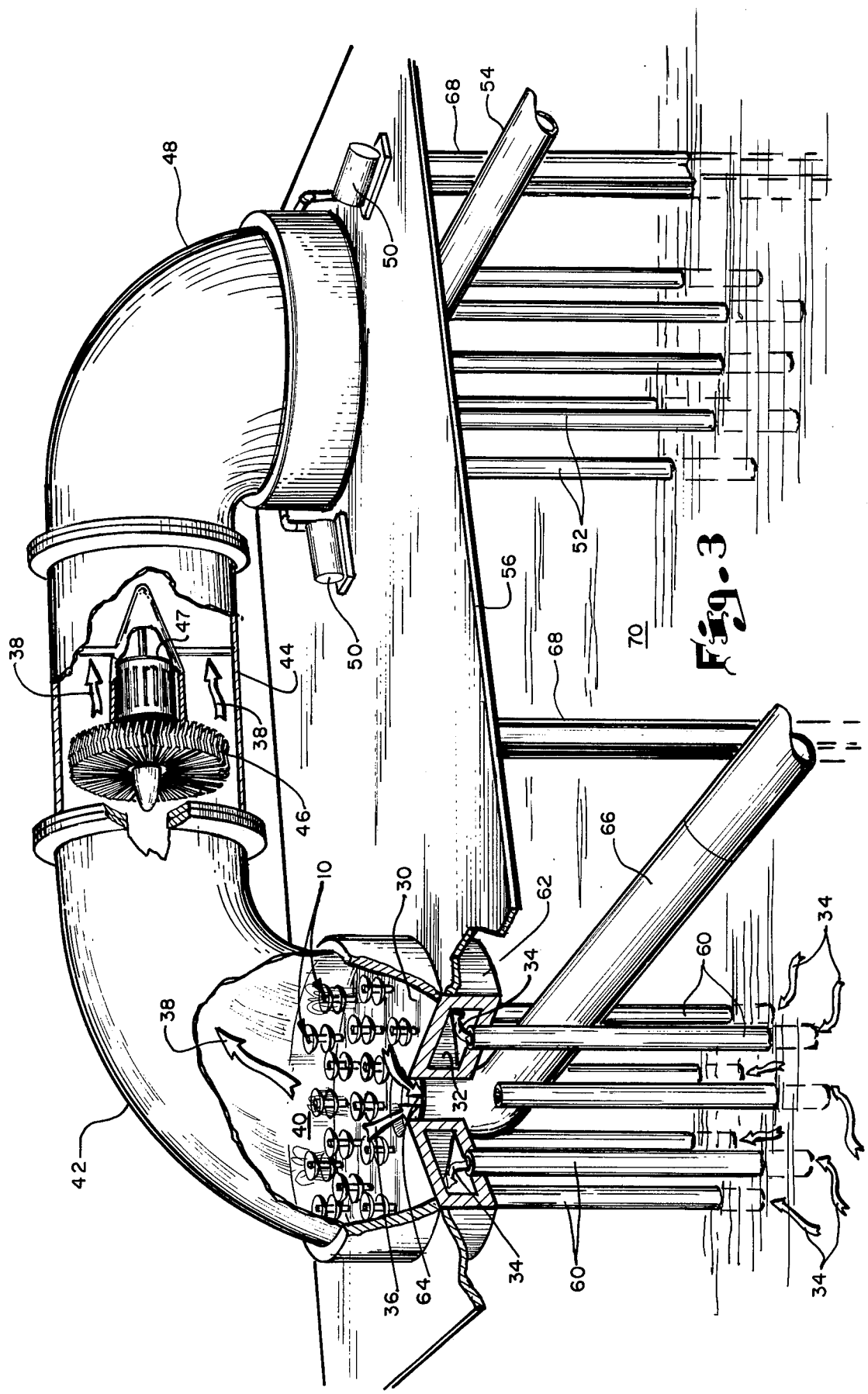

METHOD AND APPARATUS FOR FLASH EVAPORATION OF LIQUIDS

CONTRACTUAL ORIGIN OF THE INVENTION

The U.S. Government has rights in this invention pursuant to Contract No. EG-77-C-01-4042 between the U.S. Department of Energy and the Midwest Research Institute.

BACKGROUND OF THE INVENTION

The present invention relates to flash evaporation, and more particularly, to an improved vertical tube flash evaporator apparatus and method of flash evaporation utilizing same.

Flash evaporators produce steam by dropping the pressure on water at the saturation temperature. The excess heat flashes part of the water into steam. Flash evaporators of various types have been utilized extensively for many years to vaporize liquids. The conventional uses of flash evaporation are usually directed to vaporizing part or all of the solvent from a solution. A major use of the process is to purify or gather a desired material, either the solvent or the solute. Very little effort has been directed to utilizing the vapor pressure from flash evaporation for production of power.

Since the primary use of flash evaporation has been material separation or distillation, the evaporation effectiveness in relation to the power input required has not been a significant concern. In recent years, however, renewed interest has been directed to utilization of the heat stored in relatively low temperature (less than boiling point in normal atmospheric conditions) water bodies to generate power. Heat is usable by its transfer to a colder body. For example, as early as 1900, D'Arsonval proposed that power could be generated by utilizing the warm surface water of the ocean and the cold water from the deep. However, when the differential between the respective temperatures of the hot and cold body is small, it is more difficult and less efficient to produce power.

Georges Claude and Paul Boucherot made the most significant pioneer efforts in producing power from seawater approximately 50 years ago as described in their U.S. Pat. No. 2,006,985, issued July 2, 1935. They describe a process and apparatus that depends on flash evaporating a small amount of the warm water from the surface of the ocean to obtain a low pressure vapor or steam. This low pressure steam was used to turn a turbine in the process of cooling, and it was then condensed on tubes through which cold water from the deep was passed. Most of the current work and proposals for generating power from the heat stored in seawater are variations of Claude's work, known as ocean thermal energy conversion (OTEC). In practical applications, huge quantities of water must be flowed through the power generating system to obtain sufficient energy for power production because of the small temperature difference (approximately 15°-20° C.) between the warm surface layer of the ocean water and the cold deep water. Therefore, because of many energy requirements in related machinery, and because of many losses, the practical efficiency probably obtainable in such OTEC systems is in the 2-3% range. Further, the amount and cost of equipment required always increases greatly with a decrease of the temperature difference in the water utilized. Consequently, the heat available in this relatively low temperature seawater can be converted to power only with a large, costly plant, at a very low efficiency, and by handling extremely large amounts of cold seawater to absorb the heat. Therefore, even seemingly small increases in efficiency of the component parts and processes of the energy conversion system can pay huge dividends in significantly reducing the size and cost of such systems.

The current projected designs for a power production plant for an OTEC system will require a large, low pressure vapor turbine, which is as yet unbuilt and untested in the United States. It is anticipated, however, that when sufficient design efficiencies of the remaining components of this system have been developed, the large, low pressure vapor turbine will be economically feasible.

One of the components of the system in which increased efficiencies pay significant dividends is in the effective flash evaporation of the warm sea water. Claude and Boucherot used a vertical tube bubbler in their apparatus, and they also disclosed a falling jet and screen arrangement in their U.S. Pat. No. 2,006,985. Subsequent developments, usually in the material purification or distillation industry, focused on increasing surface area of the vaporizing liquid, such as by flowing films of the liquid over the surfaces of a plurality of parallel, spaced-apart vertical plates. The height of development of flash evaporators utilizing this technique for OTEC systems is illustrated by the controlled flash evaporation process and apparatus devised by Ralph C. Roe and Donald F. Othermer as described in their article, "Controlled Flash Evaporation," 93 Mechanical Engineering Journal 27–31 (1971). They described the inefficiencies of conventional multiple state flash evaporation processes in which bubbles of vapor almost explode from the turbulent surface. The controlled flash evaporation system they described as being much more efficient than conventional systems utilized films of liquid descending in a rolling flow on the inside surface of a vertical tube to vaporize quietly, practically in equilibrium, and at nearly the same temperature as the vapor formed. Roe and Othermer claimed this system eliminates losses due to turbulence.

In contravention of the trend toward laminar film flow over surfaces practically in equilibrium to quietly vaporize liquids, the inventor of this present invention has recognized that maximizing vaporization depends not only on maximizing liquid surface area, but also on constantly renewing the surface properties of the liquid. For example, evaporation on the liquid surface quickly cools the surface to the point where further vaporization in actually inhibited. Maintenance of this cool surface alone, such as in the quiet, laminar flow systems, cannot maximize vaporization. On the contrary, it is necessary to renew the vaporization surface properties by circulating warmer liquid from the inside to the outside layers or by stripping away the cooled external surface liquid to expose warmer liquid to the surface.

SUMMARY OF THE INVENTION

Accordingly, it is an object of the present invention to improve liquid evaporation effectiveness at the low design operating temperature present in an OTEC evaporator.

It is also an object of the present invention to provide an efficient process and apparatus for flash evaporation of superheated water for the production of low pressure steam.

Another object of the present invention is to provide a process and apparatus for achieving flash evaporation vaporizing effectiveness as near to thermodynamic limits as possible, and to achieve such effectiveness with minimal vertical pumping height requirements, thus creating minimal pressure loss.

Still another object of the present invention is to provide a flash evaporator apparatus that enhances renewal of surface characteristics of water droplets, sheets, and particles in the flash evaporation process to increase effectiveness in vaporization.

A further object of the present invention is to provide a flash evaporator apparatus that operates with a minimum of loss on the vapor side as the vapor produced in the evaporation process migrates away from the remaining liquid.

It is also an object of the present invention to provide a process and apparatus requiring minimum volume of water for the evaporation process, low pressure losses associated with liquid injection, low pressure losses associated with vapor withdrawal, and high effectiveness.

A further object of the present invention is to provide a simplified liquid distribution system where a number of evaporation jets are required or involved.

In a process of the present invention, the superheated liquid enters the flash chamber from the top of the vertical tube. Due to the decreased pressure in the chamber, vapor is generated from the incoming liquid in a violent explosive manner, which breaks up the liquid into many fragments of sheets, ligaments, a droplets. A diffuser comprised of a flared top portion of the vertical tube with an enlarged cross-sectional area is provided to decrease the velocity and increase the dwell time of the liquid in the top portion of the tube where the liquid is introduced to the vacuum chamber and the boiling takes place. In order to provide for additional new surfaces for evaporation, a set of flat or curved screens are strategically placed in the falling liquid rain under the opening of the tube. The used unevaporated liquid is collected and withdrawn at the bottom of the chamber, and the low pressure vapor or steam produced is drawn off at the top of the chamber.

BRIEF DESCRIPTION OF THE DRAWINGS

Other advantages and capabilities of the present invention will become more apparent as the description proceeds, taken in conjunction with the following drawings, in which:

FIG. 1 is a side-elevation view of the vertical tube flash evaporator of the present invention with a portion of the top screen cut away to reveal the diffuser at the top of the vertical tube;

FIG. 2 is a cross-sectional view of the flash evaporator apparatus taken along lines 2—2 of FIG. 1; and FIG. 3 is a perspective view of a number of the flash evaporators of the present invention positioned in a proposed typical OTEC power generation plant.

DETAILED DESCRIPTION OF THE PREFERRED EMBODIMENT

The vertical tube bubbler type flash evaporator 10 of the present invention is shown in FIGS. 1 and 2. A plurality of these flash evaporators 10 are shown mounted in a flash evaporation chamber 40 of an ocean thermal energy conversion (OTEC) power generation plant. Referring now primarily to FIGS. 1 and 2, the flash evaporator 10 of the present invention includes an elongated cylindrical tube 12 having a flared diffuser portion 14 of increasing cross-sectional area at its upper end terminating at an annular rim 16. Two perforated screens 20, 24 are positioned concentrically around the vertical tube 12 in spaced-apart relation to each other. These screens 20, 24 can be flat; however, it has been found that the curved or bowl-shaped screens as shown in FIGS. 1 and 2 are preferred, particularly where a plurality of the evaporators 10 are positioned adjacent each other in a chamber. The curved screens 20, 24 can be smaller in diameter than flat screens would have to be in order to perform the same function. Other types of obstructions besides screens may also be utilized to achieve the same function.

The upper bowl-shaped screen 20 is perforated as shown at 22 and extends radially outwardly and upwardly to substantially surround the upper diffuser portion 14 of vertical tube 12. The lower bowl-shaped screen 24 is also perforated as shown at 26 and is mounted concentrically around and extends radially outwardly and upwardly from the vertical tube 12 a spaced distance below the upper screen 20.

As best seen in FIG. 2, the flash evaporator is preferably mounted with the tube 12 extending vertically through a floor section 30 of a flash evaporation chamber 40. In using the flash evaporator 10 in the process of this invention, the chamber 40 is evacuated. Water from the reservoir 32 flows upwardly through the vertical tube 12, as indicated by flow arrow 34, into the evacuated chamber 40. As the liquid nears the top of the tube 12, it flows into the diffuser section 14 where the velocity of the flow is decreased in direct proportion to the increase in cross-sectional area. This decrease in flow velocity increases the dwell time of the liquid in the diffuser section 14 where the liquid is less confined and expansion is enhanced. it also decreases jetting effects of liquid flowing at higher velocity through a tube, and thus decreases pumping power requirements as parasite losses on the liquid side.

It is in this flow diffuser area 14 where the water is first subjected to the decreased pressure in the evacuated chamber 40. The result is that the water vaporizes into a two-phase flow in such a violent manner that it breaks up the liquid into many fragments of sheets, ligaments, and droplets. The force of the expanding vapor propels these fragments of water upwardly into the evacuated chamber above the rim 16, whereupon gravity causes a substantial portion to fall back down over the enlarged cross-sectional area of the flow diffuser 14 where they tend to collide with other such fragments being propelled upwardly by the force of the expanding vapor. This turbulence and the resulting collisions of the water fragments tend to further break up the water fragments and mix the fragments sufficiently to renew the surface properties of the fragments for more efficient vaporization.

A portion of the liquid fragments also fall and flow over or outside the rim 16 onto the perforated surface of the upper screen 20. The perforated screen provides additional new surfaces for evaporation by again breaking the water fragments into even smaller fragments, which not only increases the surface area for evaporation but also exposes more of the warm water on the interior of the fragments to the surface for more efficient evaporation.

As these water fragments fall through the perforations 22 in screen 20 and continue their downward fall therefrom, additional water is evaporated from the renewed surfaces of the fragments, thereby cooling the surfaces. Therefore, in order to enhance continued vaporization, these fragments are again impinged on the perforated lower screen 24 where they are broken up again and mixed to increase and renew the surface area of the water fragments. As new surfaces of the fragments are exposed to the evacuated atmosphere, the vaporization effectiveness is also renewed and continues more vigorously. The unevaporated water fragments eventually fall to the floor 30 and flow toward a drain as indicated by flow arrows 36.

The use of these screens 20, 24 in combination with the vertical tube bubbler 12 and diffuser 14 enable the flash evaporation effectiveness of this invention to very closely approach the maximum possible effectiveness within the limits of thermodynamic laws. It is even more significant that such effectiveness results are obtained with only minimal vertical height through which the fluid must be pumped. For example, it has been found that a vertical tube 12 with a diameter of 6 in. (15 cm), a diffuser diameter of about 8 in. (20 cm), and overall height of about 20 in. (50 cm), in combination with the two curved screens, 20, 24 can achieve at least 97% effectiveness or more in water vaporization, where effectiveness is the vaporization efficiency per unit volume of water. Therefore, the pressure loss or power required to pump the water is very low. Such efficiency is crucial in some applications, such as OTEC power generation plants where huge quantities of ocean water must be pumped through the system to generate commercial quantities of energy, as described above. Even small increases in the height to which water has to be pumped in the flash evaporation would increase significantly the pumping power required and would drastically affect the efficiency and economics of power generation in such a system.

The configuration of this flash evaporator is also effective to minimize parasitic losses on the vapor side and maximize vaporization effectiveness. More specifically, the dome-shaped configuration of the falling liquid jet minimizes the distance the vapor must migrate from the point of vaporization through the vapor-producing area and then away from the vaporizing water fragments. Therefore, the "log jam" effects of vapor back pressure due to vapor build up in the vaporization area, which could inhibit vaporization and migration of the vapors away from the vaporization area, is minimized. Even where a plurality of the flash evaporators 10 of the present invention are positioned adjacent each other in an evacuated chamber, as shown in FIG. 3 the dome-shaped vaporization area of the falling liquid fragments do not tend to interfere with the vaporization in adjacent flash evaporators 10, and the produced vapor can migrate into the vacuum chamber to be drawn off into pipe 42, as shown by arrows 38, with a minimum of back vapor pressure and other parasitic losses on the vapor side.

A typical environment for the use of flash evaporators 10 of the present invention is shown in the OTEC power generator plant in FIG. 3. The plant is comprised of a main platform 56 supported over the surface of the ocean water 70 by piles 68. An evacuated flash vaporization chamber 40 is positioned on the platform with a large tube 42 leading upwardly therefrom to a turbine housing 44. A turbine 46 is positioned in the turbine housing 44 for driving an electric generator 47. A condenser chamber 48 is connected to the turbine housing 44, and a plurality of vacuum pumps 50 connected to the condenser chamber 48 are used to evacuate the system. Warm seawater from the surface of the ocean is pumped upwardly through inlet tube 60 under the evacuated chamber 40 and into an annular manifold or distribution chamber 32 under the floor 30 of the evacuated chamber 40, as shown by flow arrows 34. From the manifold chamber 32, the water flows upwardly through the flash evaporators 10 where evaporation occurs as described above. The unvaporized water drains as indicated by the flow arrows 36 into a central drain 64 in the floor 30, from where it is discharged through drain pipe 66 back into the ocean.

The low pressure vapor produced in the flash chamber 40 migrates upwardly through tube 42 and into the turbine housing 44 where it turns a turbine 46, as indicated by the flow arrows 38. The turbine 46 is connected to an electric generator 47 which produces electricity. The vapors then continue to flow out of the turbine housing 44 and into the condenser 48. The vapor is cooled and condensed in the chamber 48 by cold water from the depths of the ocean that is pumped into the chamber through inlet tubes 52. The drain pipe 54 drains the water out of the condenser 48. Therefore, in addition to the vacuum produced by the vacuum pumps 50, the condensation of the vapor in the condensation chamber 48 decreases the pressure in the condensation chamber 48 which causes the vapor produced in the flash evaporation chamber 40 to migrate through the turbine 46 to the condensation chamber 48.

The flash evaporators 10 of the present invention can also be used for other conventional uses, such as distillation or purification of materials. For example, the enhanced effectiveness of the flash evaporators 10 could also be used to evaporate liquids from fruit juices in preparing frozen juice concentrate in less time than conventional processes to decrease losses of taste and aromatic components.

The embodiment of the present invention has been shown and described with a certain degree of particularity to enable a complete a full understanding of the invention. It should be understood, however, that the present invention involves inventive concepts defined in the appended claims, and these inventive concepts are not intended to be limited by the detailed description herein beyond that required by the prior art and as the claims are allowed. The method and apparatus for flash evaporation of the present invention can take over forms and is susceptible to various changes in detail of structure without departing from the principles of this invention.

The embodiments of the invention in which an exclusive property or privilege is claimed are defined as follows:

1. The process of vaporizing a liquid, comprising the steps of:
   flowing the liquid upwardly through a vertical tube that opens at its upper end into an evacuated chamber which causes the liquid to boil violently in the open end of the tube; and
   increasing the dwell time of said liquid in said open-end area by passing the liquid through a diffuser portion of said tube having an enlarged cross-sectional area at said open end to decrease the flow velocity therethrough.

2. The process of vaporizing a liquid, comprising the steps of:
   flowing the liquid upwardly through a vertical tube that opens at its upper end into an evacuated chamber which causes the liquid to boil violently in the open end of the tube;

increasing the dwell time of said liquid in said open-end area by passing the liquid through a diffuser portion of said tube having an enlarged cross-sectional area at said open end to decrease the flow velocity therethrough; and wherein said process further includes the step of renewing the warm temperature surface properties of the liquid after it flows out of said vertical tube by interrupting and dispersing the liquid flow with a perforated screen positioned in the liquid flow path.

3. Vertical spout flash evaporator apparatus, comprising:

an evacuated chamber;

a vertical tube extending upwardly into said evacuated chamber from the exterior thereof and opening at its upper end in said evacuated chamber; and diffuser means at the upper end of said tube for decreasing the velocity of liquid flow and increasing the dwell time of the liquid in said open-end area of said tube to enhance boiling of said liquid in that open-end area.

4. The apparatus of claim 3, wherein said diffuser means is an enlarged cross-sectional area of said tube at its upper end.

5. Vertical spout flash evaporator apparatus, comprising:

an evacuated chamber;

a vertical tube extending upwardly into said evacuated chamber from the exterior thereof and opening at its upper end in said evacuated chamber;

diffuser means at the upper end of said tube for decreasing the velocity of liquid flow and increasing the dwell time of the liquid in said open-end area of said tube to enhance boiling of said liquid in that open-end area; and wherein said diffuser means is an enlarged cross-sectional area of said tube at its upper end, and wherein said evaporator apparatus further includes a perforated surface positioned below said opening around the external peripheral surface of said vertical tube and adapted to catch the liquid flowing from said open end of said tube and mixing and breaking said liquid before allowing it to pass therethrough.

6. The apparatus of claim 5, wherein said perforated surface extends radially outwardly from said vertical tube and curves upwardly toward its outer peripheral edge.

7. The apparatus of claim 6, wherein said perforated surface is a bowl-shaped figure of revolution positioned to surround said open-end area of said vertical tube with the bottom thereof substantially closed and the top thereof open to receive the flow of liquid from the opening of said vertical tube.

8. The apparatus of claim 7, including a second bowl-shaped perforated surface positioned around the vertical tube a spaced distance below said first perforated surface.

9. Vertical spout flash evaporator apparatus, comprising:

an evacuated chamber;

a vertical tube extending upwardly into said evacuated chamber from the exterior thereof and opening at its upper end in said evacuated chamber; and a perforated surface positioned below said opening around said vertical tube and extending radially outward from said tube.

10. The apparatus of claim 9, wherein said tube is flared outwardly at its upper end.

11. Flash evaporator apparatus for vaporizing a liquid, comprising:

an elongated tubular member adapted for conveying liquid therethrough, said tubular member having inlet means at one end and an outlet means at the opposite end, a flash chamber in said tubular member at said outlet means for causing said liquid to vaporize at said outlet area;

diffuser means for increasing the residence time of said liquid in said flash chamber, said diffuser means being a portion of said outlet means having a diverging cross-sectional area that is larger than the cross-sectional area of the remaining portion of said tubular member; and a perforated surface disposed around said outlet means in a manner to intercept liquid exiting said outlet means for breaking up said liquid and renewing the surface properties thereof.

* * * * *